US010744649B2

(12) United States Patent
Lewis

(10) Patent No.: US 10,744,649 B2
(45) Date of Patent: Aug. 18, 2020

(54) DRONE PAYLOAD SYSTEM

(71) Applicant: GearWurx, Nibley, UT (US)

(72) Inventor: Collin Lewis, Nibley, UT (US)

(73) Assignee: GearWurx, Nibley, UT (US)

( * ) Notice: Subject to any disclaimer, the term of this patent is extended or adjusted under 35 U.S.C. 154(b) by 0 days.

(21) Appl. No.: 16/105,868

(22) Filed: Aug. 20, 2018

(65) Prior Publication Data

US 2019/0054630 A1 Feb. 21, 2019

Related U.S. Application Data

(60) Provisional application No. 62/547,331, filed on Aug. 18, 2017.

(51) Int. Cl.
| | |
|---|---|
| *B25J 13/06* | (2006.01) |
| *G05D 1/00* | (2006.01) |
| *B64D 9/00* | (2006.01) |
| *B25J 15/00* | (2006.01) |
| *B64C 39/02* | (2006.01) |
| *B25J 15/08* | (2006.01) |
| *B25J 15/02* | (2006.01) |

(52) U.S. Cl.
CPC .......... *B25J 13/06* (2013.01); *B25J 15/0033* (2013.01); *B25J 15/022* (2013.01); *B25J 15/086* (2013.01); *B64C 39/024* (2013.01); *B64D 9/00* (2013.01); *G05D 1/0016* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 9,641,810 B2* | 5/2017 | Zufferey | ............... | G05D 1/0094 |
| 9,764,838 B2* | 9/2017 | Priest | .................... | B64C 39/024 |
| 9,841,761 B2* | 12/2017 | Shehata | ................. | H04N 7/181 |
| 9,988,140 B2* | 6/2018 | Priest | ...................... | B64C 27/06 |
| 10,384,804 B2* | 8/2019 | Priest | ...................... | B64D 47/08 |
| 2009/0050750 A1* | 2/2009 | Goossen | ............... | B64C 39/024 |
| | | | | 244/76 R |
| 2011/0221692 A1* | 9/2011 | Seydoux | ............. | G06F 3/04817 |
| | | | | 345/173 |
| 2012/0226394 A1* | 9/2012 | Marcus | ..................... | A62B 5/00 |
| | | | | 701/2 |
| 2015/0142211 A1* | 5/2015 | Shehata | ................. | H04N 7/181 |
| | | | | 701/2 |
| 2016/0244187 A1* | 8/2016 | Byers | ..................... | B64C 39/024 |
| 2016/0309346 A1* | 10/2016 | Priest | .................... | B64C 39/024 |
| 2016/0353669 A1* | 12/2016 | Xavier | ................... | B25J 18/025 |
| 2019/0054630 A1* | 2/2019 | Lewis | ....................... | B25J 13/06 |

* cited by examiner

*Primary Examiner* — Bhavesh V Amin
(74) *Attorney, Agent, or Firm* — Kunzler Bean & Adamson

(57) ABSTRACT

A drone payload device includes a remote drone arm and a control module. The remote drone are is coupleable to a drone. The remote drone arm includes a base, an arm, and a gripper. The base includes mounting hardware to couple to the drone. The arm extends from the base. The griper is coupled to the arm at an end of the arm distal from the base. The control module is coupleable to a drone controller. The control module is to provide a control signal to the remote drone arm to control a movement of at least one of the arm and the gripper.

20 Claims, 12 Drawing Sheets

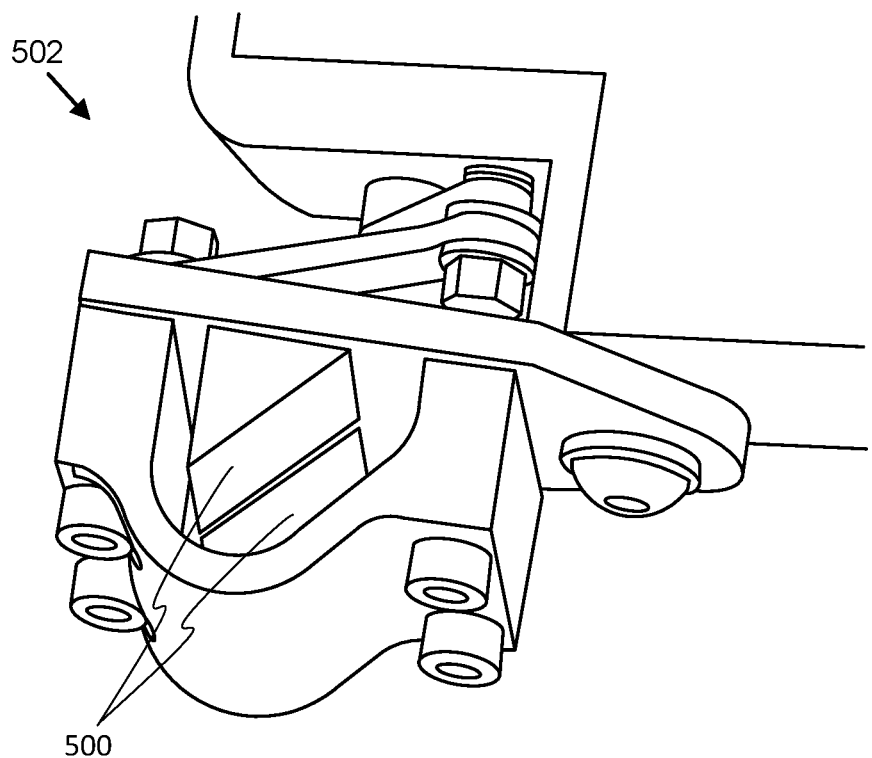
FIG. 5A
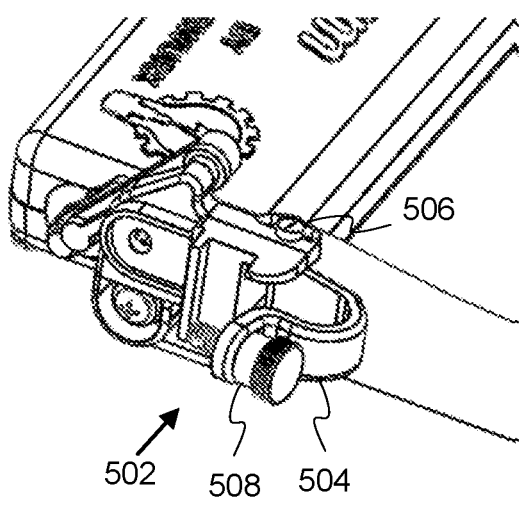
FIG. 5B1
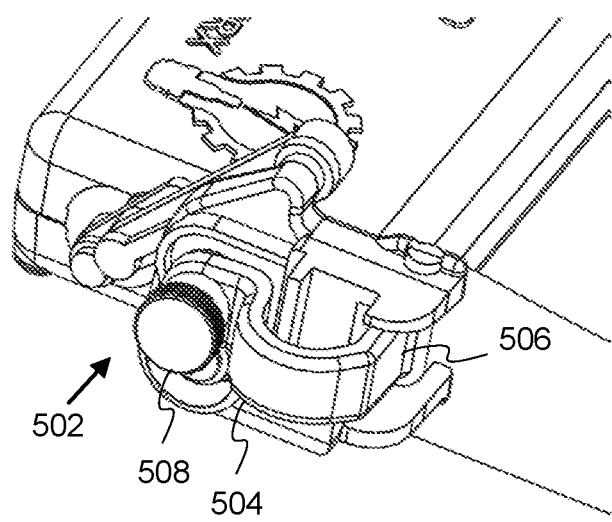
FIG. 5B2

DRONE PAYLOAD SYSTEM

CROSS-REFERENCES TO RELATED APPLICATIONS

This application claims the benefit of U.S. Provisional Patent Application No. 62/547,331 entitled "DRONE PAYLOAD SYSTEM" and filed on 18 Aug. 2017 for Collin Lewis, which is incorporated herein by reference.

FIELD

This invention relates to remote-control drones and more specifically to an accessory for a remote-control drone.

BACKGROUND

Description of the Related Art

Remote control drones are vehicles or platforms that are controlled via signals sent to the drone. In some cases, the drone returns a signal such as a sensor reading or camera feed. Drones provide access to areas or vantages that are unsafe or are not easily accessible. Drones generally carry a fuel or power source onboard as well as a drive system and a control system.

SUMMARY

A drone payload device is disclosed. The drone payload device includes a remote drone arm and a control module. The remote drone are is coupleable to a drone. The remote drone arm includes a base, an arm, and a gripper. The base includes mounting hardware to couple to the drone. The arm extends from the base. The griper is coupled to the arm at an end of the arm distal from the base. The control module is coupleable to a drone controller. The control module is to provide a control signal to the remote drone arm to control a movement of at least one of the arm and the gripper.

A drone cargo system is also disclosed. The drone cargo system includes a drone, a remote drone arm, and a control module. The remote drone are is coupleable to the drone. The remote drone arm includes a base, an arm, and a gripper. The base includes mounting hardware to couple to the drone. The arm extends from the base. The griper is coupled to the arm at an end of the arm distal from the base. The control module is coupleable to a drone controller. The control module is to provide a control signal to the remote drone arm to control a movement of at least one of the arm and the gripper.

A method of operation a remote drone arm is also disclosed. The method includes receiving an input at a control interface of a control module capable of being coupled to a drone controller. The method also includes generating an outgoing control signal at the control module. The method also includes sending the outgoing control signal to the remote drone arm capable being coupled to a drone. The method also includes receiving the outgoing control signal at the remote drone arm. The method also includes executing the outgoing control signal at the remote drone arm to move one or more components of the remote drone arm.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which:

FIG. 5A is a perspective view illustrating one embodiment of a mounting structure of a remote drone arm;

FIG. 5B1 is a perspective view illustrating one embodiment of a quick coupling mounting hardware of a remote drone arm in an open position;

FIG. 5B2 is a perspective view illustrating one embodiment of a quick coupling mounting hardware of a remote drone arm in a closed position;

DETAILED DESCRIPTION

Figure 1:
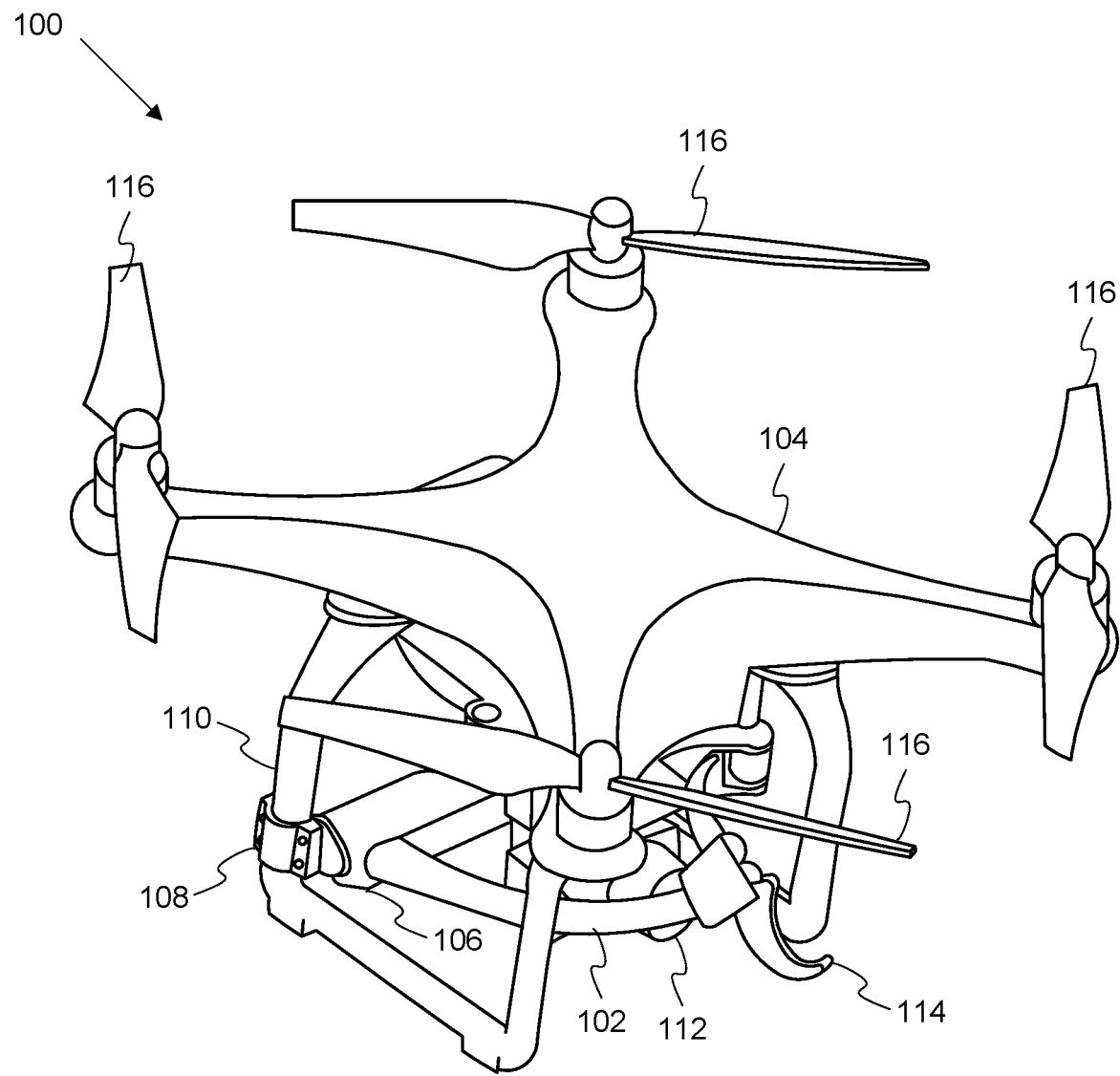
FIG. 1 is a perspective view illustrating one embodiment of a remote drone arm system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In the above description, certain terms may be used such as "up," "down," "upper," "lower," "upward," "downward," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of" or "one or more", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The flowcharts included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding blocks shown.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product.

The schematic flowchart diagrams and/or schematic block diagrams in the Figures illustrate the architecture, functionality, and operation of possible implementations of apparatuses, systems, and methods according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Embodiments described herein relate to a remote drone arm which adds object manipulation capabilities to a drone platform. Some embodiments of the remote drone arm provide an independent add-on device which can be added to a drone platform without interfering with other components of the drone. Some embodiments of the remote drone arm are incorporated into the drone during manufacture of the drone.

Some embodiments of the remote drone arm include an arm assembly that attaches to the drone platform with independent power, control, and signal components. Other embodiments of the remote drone arm rely on a central power source of the drone. Some embodiments of the remote drone arm include a control module which can be coupled to a drone controller to provide a control interface for the arm assembly without the need for a separate item to be handled apart from the drone controller.

Some embodiments of the remote drone arm provide the ability to interface with an object while the drone is static/landed or while the drone is dynamic/flying. Some embodiments of the remote drone arm add a payload or cargo carrying/retrieving/delivering capacity to a drone platform. Some embodiments provide the ability to remotely position the arm across a plurality of axes and manipulate the gripper from the drone controller.

Some embodiments of the remote drone arm have mechanical linkages with mechanical advantages to conserve power while providing the necessary force and movement to position the arm and manipulate an object. Additional details and examples are described below with reference to the several figures.

FIG. 1 is a perspective view illustrating one embodiment of a remote drone arm system 100. The illustrated embodiment includes a remote drone arm 102 attached to a drone 104. The remote drone arm 102 is coupled to a base 106 of the remote drone arm 102.

In some embodiments, the base 106 includes mounting hardware 108. In some embodiments, the mounting hardware 108 is attached to a portion of the drone 104. In the illustrated embodiment, the mounting hardware 108 is attached to the landing strut 110 of the drone 104. In some embodiments, the mounting hardware 108 has a geometry fit to a geometry of the landing strut 110 of the drone 104. The mounting hardware 108 is described in more detail below with reference to FIG. 5A.

In some embodiments, the mounting hardware 108 includes a locking structure. In some embodiments, the mounting hardware 108 includes a quick coupling to provide ease of attaching and removing the base 106. Examples of a quick coupling are described in more detail below with reference to FIGS. 5B1 and 5B2.

In the illustrated embodiment, the mounting hardware 108 is pivotably coupled to the base 106. In some embodiments, pivoting the base 106 relative to the mounting hardware 108 moves the remote drone arm 102. In the illustrated embodiment, the remote drone arm 102 is coupled to the base 106 in an off-center location on the base 106. In some embodiments, the off-center location of the remote drone arm 102 on the base 106 is to accommodate a component 112 under-mounted on the drone 104. In the illustrated embodiment, the remote drone arm 102 accommodates a camera mounted on the drone 104. In other embodiments, the component 112 includes a sensor suite, one or more cameras, or other equipment.

In the illustrated embodiment, the remote drone arm 102 includes a gripper 114 at an end of the remote drone arm 104 distal to the base 106. In some embodiments, the gripper 114 is operable to apply a gripping force to an object to secure the object for transport or manipulation. Embodiments of the gripper 114 are described in more detail below with reference to FIGS. 3A-C.

In the illustrated embodiment, the drone 104 is a multirotor drone with a plurality of rotors 116. In some embodiments, the drone 104 includes four rotors 116. In other embodiments, the drone 104 includes fewer or more than four rotors 116. In some embodiments, the drone 104 is capable of remote-piloted or pre-programmed flight. In some embodiments, the drone 104 receives control signals from a drone controller (not shown). In other embodiments, the drone 104 stores flight information and executes the stored flight information. In some embodiments, the drone 104 operates on a combination of real-time and stored commands.

In some embodiments, the drone 104 receives a control signal separately from a control signal received at the remote drone arm 102. In other embodiments, the drone 104 and the remote drone arm 102 receive a combined control signal. In some embodiments, there is no communication between the drone 104 and the remote drone arm 102. In other embodiments, the drone 104 and the remote drone arm 102 communicate one with another.

Figure 2A:
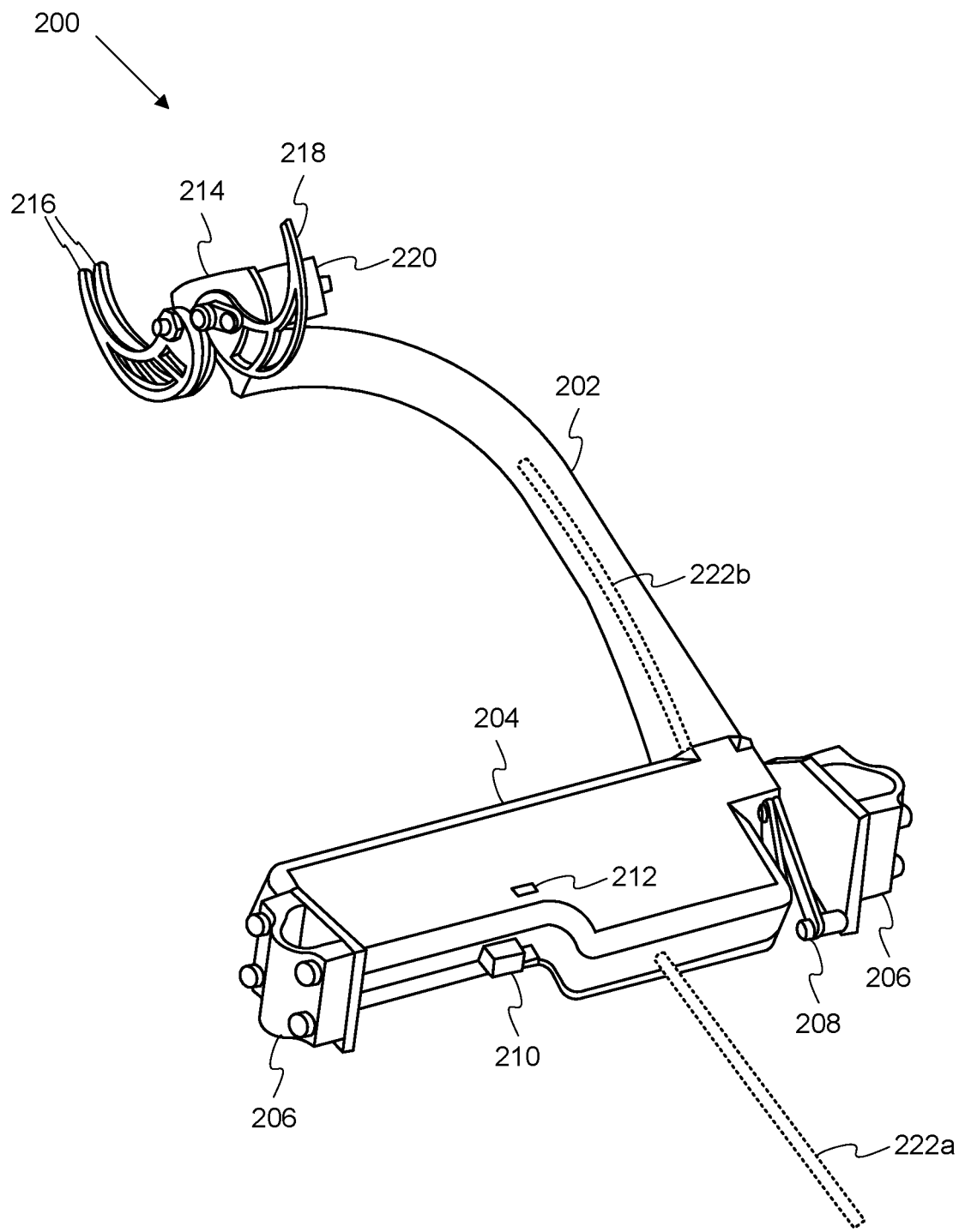
FIG. 2A is a perspective view illustrating one embodiment of a remote drone arm.

FIG. 2A is a perspective view illustrating one embodiment of a remote drone arm 200. The illustrated embodiment includes an arm 202. In the illustrated embodiment, the arm 202 is partially curved. In some embodiments, the curve in the arm 202 allows the arm 202 to operate through a range of motion without interfering with other components or structure of a drone. For example, the geometry of the arm 202 may allow the arm 202 to operate through a range of motion around a sensor package of a drone to which the remote drone arm 200 is coupled.

In some embodiments, the arm 202 is capable of at least one of pitch, yaw, roll, and extension movements. In some embodiments, the structure of the arm 202 itself allows for one or more of these movements. For example, the arm 202 may include one or more joints, pivots, or telescoping sections. In other embodiments, movement of the arm 202 is facilitated by other structures or characteristics of the remote drone arm 200.

In some embodiments, the arm 202 has a cross section that is at least partially rounded. In other embodiments, the arm 202 has a cross section that is at least partially angled. In some embodiments, the arm 202 has a hybrid cross section with both rounded and angled portions. In some embodiments, the arm 202 is hollow. In some embodiments, the arm 202 is reinforced.

In some embodiments, the cross section of the arm 202 varies depending on location along the arm 202. For example, the cross section of the arm 202 near an end may be wider than at a middle portion of the arm 202. In some embodiments, the geometry of the arm 202 varies subtly without pronounced transitions. In other embodiments, the geometry of the arm 202 varies abruptly with pronounced transitions from a first geometry to a second geometry.

In some embodiments, the arm 202 is rigid. In other embodiments, the arm 202 is flexible. For example, the arm 202 may include one or more flex points along the arm 202 at which the arm 202 may bend under the force of a load, gravity, or a drive system such as a servo motor. In other embodiments, the arm 202 may be a linkage which includes multiple rigid parts which move with respect to one another. In some embodiments, the arm 202 includes rotational and angular movement components.

In the illustrated embodiment, the arm 202 is coupled to the base 204. In some embodiments, the arm 202 is permanently or removably coupled to the base. 204. For example, the arm 202 may be permanently fixed to the base 204 to prevent accidental detachment of the arm 202 from the base 204 resulting in loss of a payload carried by the arm 202. The arm 202 may also be removably coupled to the base 204 to facilitate changing the arm 202 to accommodate a specific operation or functionality.

For example, one version of the arm 202 may have a specific attachment, capacity, speed, arrangement, or other characteristics. that is suited for a specific mission or purpose. Another version of the arm 202 may have other characteristics which are suited to another mission or purpose. Swapping of the arm 202 to provide a functionality corresponding to a mission may be advantageous.

In the illustrated embodiment, the base 204 includes mounting hardware 206. In the illustrated embodiment, two mounting hardware 206 are included. In other embodiments, one or more than two mounting hardware 206 are used. In the illustrated embodiment, the mounting hardware 206 is a bolted cap coupler to be secured to a leg or landing strut of a drone. In other embodiments, the mounting hardware 206 includes a clamp, a hook, a through-bolt, or other hardware capable of providing sufficient force to secure the remote drone arm 200 to a drone. As described above the mounting hardware 206 may include a quick coupling feature to facilitate easy removal and installation. For example, the quick coupling feature may include a hinge and an attachment structure such as a thumbscrew, a snap, a latch, a clip, a friction lock, a clasp, or other retaining structures. In some embodiments, the attachment structure is captive relative to the mounting hardware 206. In other embodiments, the attachment structure is removable or separable relative to the mounting hardware 206.

In the illustrated embodiment, at least one of the mounting hardware 206 is coupled to the base 204 via a linkage assembly 208. In some embodiments, the linkage assembly 208 applies a force to the mounting hardware 206 to move the base 204 relative to the mounting hardware 206. In the illustrated embodiment, the linkage assembly 208 is a two-bar rocker-rocker linkage to provide rotational movement of the base 204 relative to the mounting hardware 206. Embodiments of the mounting hardware 206 are described in greater detail below with respect to FIGS. 5A-5B2.

In some embodiments, the linkage assembly 208 is driven by a servo or other driving force. In some embodiments, the movement of the linkage assembly 208 is electronically controlled. In some embodiments, the movement of the linkage assembly 208 and relative position of the linkage assembly 208 is tracked. Further details regarding embodiments of the linkage are includes below with reference to FIG. 4A-B.

The illustrated embodiment of the base 204 also includes a connection point 210. In some embodiments, the connection point 210 facilitates connection of a power or data source to the base 204. For example, a cord to supply power to an internal battery of the base 204 may be connected at the connection point 210. In another example, a data connection may be established via the connection point 210 to provide data to the base 204 of the remote drone arm 200. Data may include commands to move the remote drone arm 200 based on a movement schedule or programming. Data may also include positional calibration for movement of the linkage assembly 208. Other data may also be used, accessed, and/or communicated via the connection point 210.

The illustrated embodiment of the base 204 also includes an indicator 212. In some embodiments, the indicator 212 is an electronic or physical indicator to communicate a status of the remote drone arm 200. In some embodiments, the indicator 212 communicates a charge status, connection status, movement status, capacity status, range status, or other status of the remote drone arm 200.

In the illustrated embodiment, the remote drone arm 200 also includes a gripper 214. In the illustrated embodiment, the gripper 214 is attached to an end of the arm 202 distal from the base 204. In the illustrated embodiment, the gripper 214 includes two fingers 216 and a thumb 218. In some embodiments, the gripper 214 is oriented substantially parallel relative to the arm 202. In other embodiments, the gripper 214 is oriented at an angle relative to the arm 202. In some embodiments, the gripper 214 is oriented at an angle relative to the arm 202 to facilitate manipulation of an object by the gripper 214 while the arm 202 is positioned at a downward angle.

In some embodiments, the angle of the gripper 214 relative to the arm 202 facilitates retrieval of an object by the gripper 214 while a drone, to which the remote drone arm 200 is coupled, is in flight. For example, if the drone is moving forward and the arm 202 is in a deployed position, the angle of the gripper 214 allows the fingers 216 to act as both a hook and a pincer to secure the object.

In some embodiments, the gripper 214 is capable of at least one of pitch, yaw, roll, and extension movements relative to the arm 202 in addition to actuation of the fingers 216 and thumb 218. In the illustrated embodiment, the fingers 216 and thumb 218 actuate by each rotating at the gripper 216 towards one other in a scissor-like motion in which the thumb 218 rotates to pass between the fingers 216. This puts the fingers 216 and thumb 214 in double-shear.

In some embodiments, movement of at least one of the gripper 214 and the arm 202 is controlled manually by a manual input at a control interface of a control module in communication with the remote drone arm 200. In other embodiments, movement of at least one of the gripper 214 and the arm 202 is computer controlled. In some embodiments, movement of at least one of the gripper 214 and the arm 202 occur in response to signals received from one or more sensors or detection systems.

In some embodiments, the arm 202 includes one or more sensors. In some embodiments, the sensors are placed in the gripper 214 or in the structure of the arm 202 apart from the griper 214. In some embodiments, sensors facilitate guided movement or action of the arm 202 and/or the gripper 214. For example, the sensors may provide a target lock for an object to be retrieved and the remote drone arm 200 may send commands to the drone to navigate within a retrieval distance of the object. In some examples, the remote drone arm 200 may execute further commands to retrieve the object upon detection that the object is within the retrieval distance.

In some embodiments, the sensors facilitate automated operation of the gripper 214. For example, the sensors may detect a proximity of the object to be retrieved and actuate the gripper 214 to secure the object. In some embodiments, the sensors provide information to generate closure instructions describing a degree of closure for the gripper 214 to secure the object. Further functionality may be achieved through the addition or incorporation of sensors on or near the remote drone arm 200.

In some embodiments, the fingers 216 and the thumb 218 are synchronized by a mechanical connection between the fingers 216 and the thumb 218. In other embodiments, the fingers 216 and the thumb 218 move independent of one another. The illustrated embodiment of the gripper 214 also includes a housing 220. In some embodiments, the housing 220 at least partially encloses a servo motor or other drive system to move the fingers 216 and/or thumb 218. Further details regarding embodiments of the gripper 214 are described below with reference to FIGS. 3A-C.

The illustrated embodiment also includes an external antenna 222*a*. In some embodiments, the external antenna 222*a* is arranged to extend from the base 204 in a direction opposite the arm 202. In other embodiments, the external antenna 222*a* extends parallel, orthogonal, or at another angle relative to the arm 202 or other structure of the remote drone arm 200.

In the illustrated embodiment, the remote drone arm 200 includes an internal antenna 222*b* disposed within the arm 202. In some embodiments, the internal antenna 222*b* reduces the likelihood of conflict with a drone platform, components of the drone platform, or with other surroundings of the remote drone arm 200. In some embodiments, the internal antenna 222*b* extends within the arm 202 from the base 204 to the gripper 214. In other embodiments, the internal antenna 222*b* extends partially to the gripper 214 within the arm 202. In some embodiments, a first portion of the antenna 222 is internal to the remote drone arm 200 and a second portion of the antenna 222 is external to the remote drone arm 200.

In some embodiments, the remote drone arm 200 includes a single antenna 222. In other embodiments, the remote drone arm 200 includes at least two antennas 222 for redundancy or other improvements in communication. In some embodiments, the remote drone arm 200 includes a plurality of antennas in a plurality of arrangements.

Figure 2B:
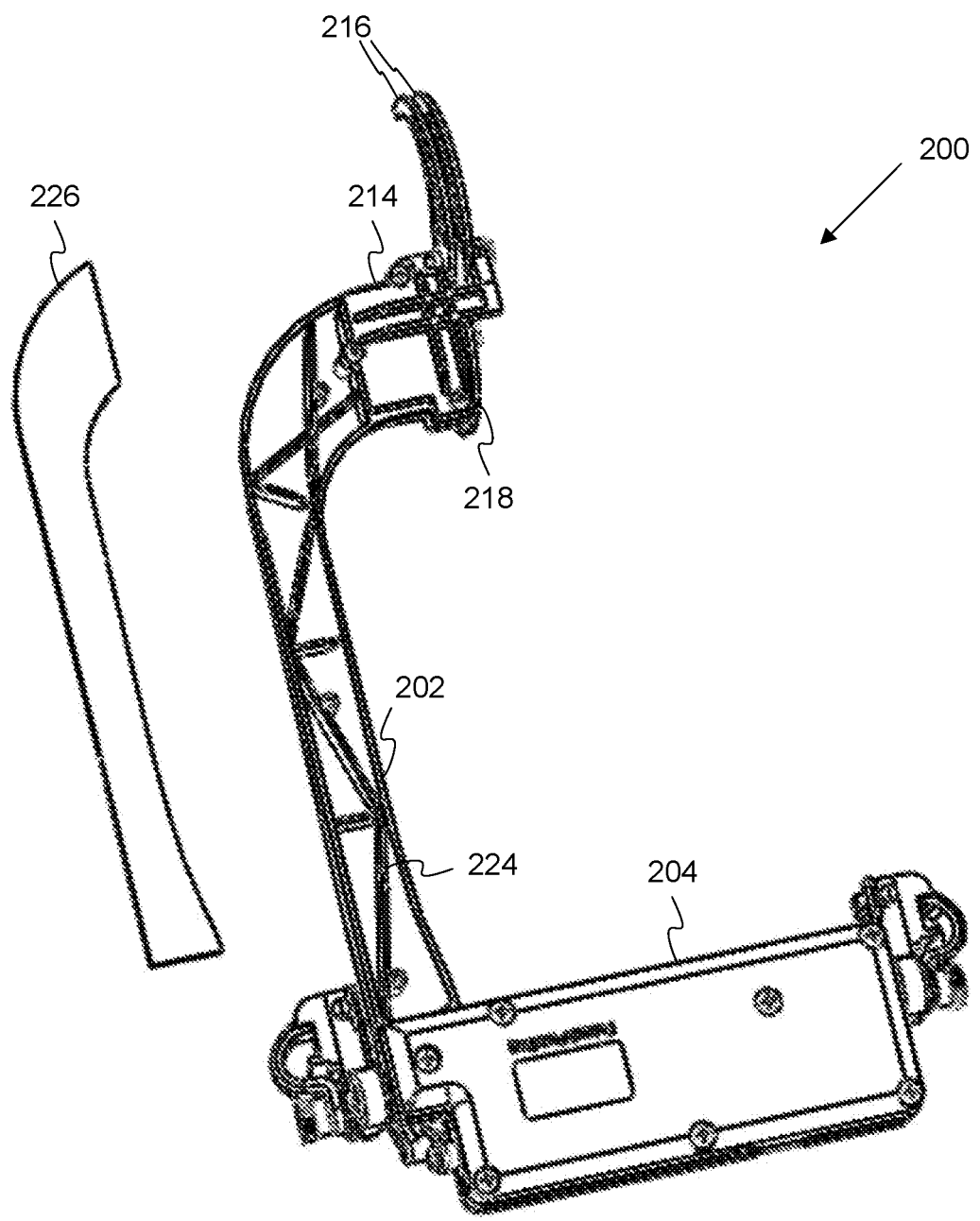
FIG. 2B is a perspective view illustrating another embodiment of a remote drone arm.

FIG. 2B is a perspective view illustrating another embodiment of a remote drone arm. In the illustrated embodiment, the remote drone arm 200 includes a slightly different geometry from that shown and described above with reference to FIG. 2A. In the illustrated embodiment, the remote drone arm 200 includes a reinforced structure 224 in the arm 202. In some embodiments, the reinforced structure 224 is a stinger or skeletal system for reinforcing the arm 202. In some embodiments, addition of the reinforced structure 224 reduces the weight and/or improve the stiffness of the arm 202.

In the illustrated embodiment, the remote drone arm 200 also includes a stiffener element 226. In some embodiments, the stiffener element 226 is applied to the arm 202 to stiffen the structure of the arm 202. In some embodiments, the stiffener element 226 is a plate having a geometry matching a geometry of the arm 202. In other embodiments, the stiffener element 226 is a tube or half-tube. In other embodiments, the stiffener element 226 has other geometries.

In some embodiments, the stiffener element 226 corresponds to a portion of the arm 202. In other embodiments, the stiffener element 226 corresponds to the full length of the arm 202. In some embodiments, the stiffener element 226 provides stiffness in a single direction. In other embodiments, the stiffener element 226 provides stiffness in more than one direction.

In some embodiments, the stiffener element 226 is, at least partially, made of a composite material. For example, the stiffener element 226 may include carbon fiber composite, glass fiber composite, nanotube composite, or another composite. In other embodiments, the stiffener element 226 is, at least partially, metallic. In some embodiments, the stiffener element 226 is, at least partially, ceramic. Other materials may be included in the stiffener element 226.

In the illustrated embodiment, the gripper 214 includes an enclosed servo. In some embodiments, the gripper 214 may be sealed to reduce dust and water contamination of the gripper 214 and associated components such as sensors, servos, and other elements.

Figure 3A:
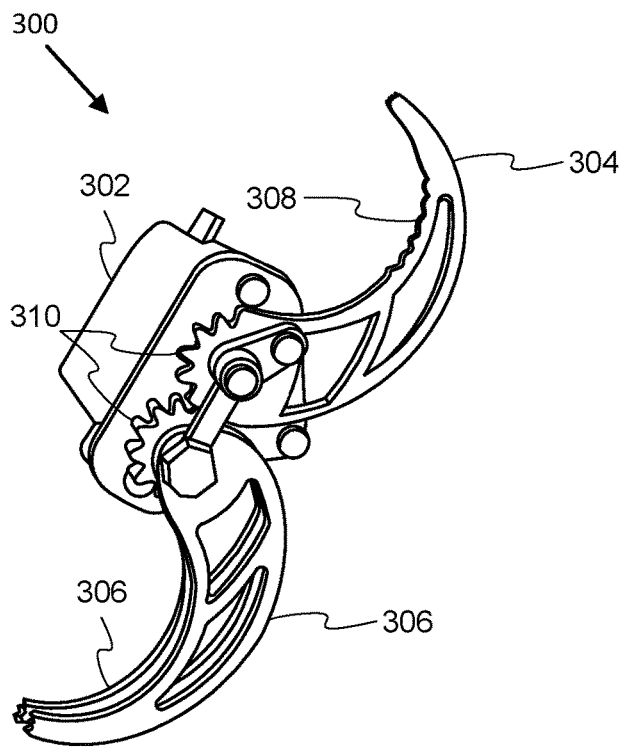
FIG. 3A is a perspective view illustrating one embodiment of a gripper of a remote drone arm in an open position.

FIG. 3A is a perspective view illustrating one embodiment of a gripper 300 of a remote drone arm in an open position. In the illustrated embodiment, the gripper 300 includes a housing 302. In some embodiments, the housing 302 is a plastic, metal, composite, ceramic, or other material. In some embodiments, the housing 302 substantially surrounds components corresponding to the gripper 300. For example, the housing 302 may substantially surround at least one of a servo motor, a control module, a sensor, or other components.

In the illustrated embodiment, the gripper 300 also includes a thumb 304 and fingers 306. In the illustrated embodiment, the thumb 304 is sickle-shaped. In other embodiments, the thumb 304 includes a serrated portion. In some embodiments, the serrated portion 308 provides additional grip for the gripper 300. In some embodiments, the thumb 304 is positioned on an upper side of the remote drone arm gripper 300 to provide additional grip without presenting a possible snagging or hanging point for items upon drop or during introduction of the object to the gripper 300. In some embodiments, the fingers 306 also include serrated portions or other structures or surface treatments to improve grip.

In the illustrated embodiment, the fingers 306 are positioned to oppose the thumb 304. In the illustrated embodiment, two fingers 306 are aligned to pass on opposite sides of the thumb 304 in a scissor-like closing motion. In other embodiments, the gripper 300 includes a single finger 306 or more than two fingers 306 opposite the thumb 304. In some embodiments, the gripper 300 includes more than one thumb 304.

In the illustrated embodiment, the thumb 304 and the fingers 306 include textured tips. In some embodiments, the textured tips provide additional grip to secure or manipulate an object or surface. In some embodiments, the textured tips are formed in the material forming the thumb 304 and fingers 306. In other embodiments, the textured tips are a different material applied to the tips of the thumb 304 and the fingers 306. In some embodiments, one of the thumb 304 and the fingers 306 includes a textured tip while the other does not.

In some embodiments, the tips of at least one of the thumb 304 and the fingers 306 is tapered to reduce the likelihood of the tip binding and preventing the thumb 304 and the fingers 306 from passing into double shear. In other embodiments, at least one of the thumb 304 and the fingers 306 have a taper applied to the length of the at least one of the thumb 304 and the fingers 306.

In some embodiments, the thumb 304 and fingers 306 are formed of a material having a high strength-to-weight ratio. In some embodiments, the material forming the thumb 304 and the fingers 306 is a composite. In some embodiments, the composite is a carbon fiber matrix composite. In other embodiments, a metal or plastic forms one or more of the thumb 304 and the fingers 306.

In the illustrated embodiment, the thumb 304 and fingers 306 are skeletonized or have material removed to result in a frame-like form to reduce weight while maintaining strength and rigidity. In some embodiments, at least one of the thumb 304 and the fingers 306 are reinforced. For example, the fingers 306 may be reinforced by joining the fingers 306 together at one or more points along a length of the fingers 306.

In some embodiments, at least one of the thumb 304 and the fingers 306 includes a spring structure to provide grip and reduce a potential for damage to one or more drive systems controlling movement of the at least one of the thumb 304 and/or fingers 306. For example, at least one of the thumb 304 and fingers 306 may include a deformable material to allow for deflection in the structure or shape of at least one of the thumb 304 and fingers 306.

In another embodiment, the gripper 300 includes a spring element between a drive system of at least one of the thumb 304 and the fingers 306 which allows for deflection in the spring element to maintain grip and reduce a potential for data to the drive system. For example, if the gripper 300 is engaged with an object, the drive system may receive a command and attempt to reach a particular position with the thumb 304 and/or fingers 306. Because at least a portion of the object is between thumb 304 and fingers 306, the object prevents the gripper 300 from reaching the position specified by the command. To prevent the drive system from generating heat and potentially failing, the spring element allows the drive system to reach the command position and still maintain gripping force on the object.

In the illustrated embodiment, the thumb 304 and the fingers 306 interface with each other at a synchronization interface 310. In the illustrated embodiment, the synchronization interface 310 includes a toothed portion on each of the thumb 304 and the fingers 306 which interact to synchronize movement of the thumb 304 and the fingers 306. In some embodiments, synchronization of the thumb 304 and the fingers 306 allows a driving force to be applied to one of the thumb 304 and the fingers 306 to drive the thumb 304 and the fingers 306 simultaneously. In some embodiments, each of the thumb 304 and the fingers 306 has a dedicated drive system to apply force with the synchronization interface 310 synchronizing the movement of the thumb 304 and the fingers 306 without providing the sole driving force for one or the other of the thumb 304 and the fingers 306.

In some embodiments, the synchronization interface 310 includes a linked connection. In other embodiments, the synchronization interface 310 includes a smooth friction interface. Other embodiments include other mechanical, magnetic, or electrical approaches for synchronizing movement of the thumb 304 and the fingers 306.

In some embodiments, the synchronization interface 310 includes an enclosed interface or shielding to prevent material or an object from jamming the synchronization interface 310. In some embodiments, the synchronization interface 310 provides similar motion in the thumb 304 and the fingers 306. In other embodiments, the synchronization interface 310 facilitates movement of one of the thumb 304 and the fingers 306 at a different rate from the other of the thumb 304 and the fingers 306.

In some embodiments, at least one of the thumb 304 and the fingers 306 includes an indicator to visually or electronically indicate a relative displacement or state of at least one of the thumb 304 and the fingers 306. For example, at least one of the thumb 304 and the fingers 306 includes an optical marking or plurality of markings to visually indicate a relative position of the thumb 304 and the fingers 306. In other embodiments, at least one of the thumb 304 and the fingers 306 includes a sensor or emitter to communicate a location or state of at least one of the thumb 304 and the fingers 306.

In some embodiments, the sensors or visual indicators are visible to the camera to facilitate visual feedback of the relative position of the fingers 306 and thumb 304 and the gripper 300 generally. In some embodiments, the visual indicators include a coating or other coloration difference. In other embodiments, the visual indicators include a visible structure incorporated into at least lone of the fingers 306 and the thumb 304.

Figure 3B:
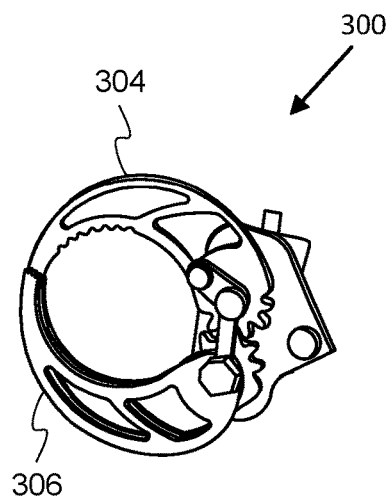
FIG. 3B is a perspective view illustrating one embodiment of the gripper of FIG. 3A in a partially closed position.

FIG. 3B is a perspective view illustrating one embodiment of the gripper 300 of FIG. 3A in a partially closed position. In the illustrated embodiment, a thumb 304 and fingers 306 of the gripper 300 are partially closed with the thumb 304 passing in double shear between the fingers 306. In some embodiments, the thumb 304 and fingers 306 impact at the tips in a closed position leaving an open region between the thumb 304 and finger 306.

In some embodiments, at least one of the thumb 304 and the fingers 306 includes a physical stop to stop the other of thumb 304 and the fingers 306. In some embodiments, the stop prevents overtravel of at least one of the thumb 304 and the fingers 306 relative to the other. In some embodiments, the stop prevents damage to or provides a resting position for at least one of the thumb 304 and the fingers 306, prevents damage to or energy consumption of a servo motor or other movement control system, or prevents impact of at least one of the thumb 304 and the fingers 306 on another component of a drone or remote drone arm. In other embodiments, the stop provides structural support between the fingers 306 or within the structure of the thumb 304.

Figure 3C:
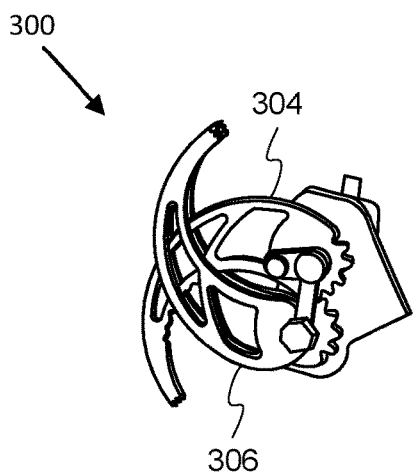
FIG. 3C is a perspective view illustrating one embodiment of the gripper of FIG. 3A in a fully closed position.

FIG. 3C is a perspective view illustrating one embodiment of the gripper 300 of FIG. 3A in a fully closed position. In the illustrated embodiment, a thumb 304 and fingers 306 of the gripper 300 are closed in a dual bypass arrangement with the thumb 304 passing between the finger 306. In other embodiments, the thumb 304 moves along an outside of the fingers 306 instead of between the fingers 306.

In some embodiments, the thumb 304 is fixed and the fingers 306 move to close the gripper 300 as illustrated. In other embodiments, the fingers 306 are fixed and the thumb 304 moves to close the gripper 300 as illustrated. Other movement and fixture schemes are also contemplated.

Figure 3D:
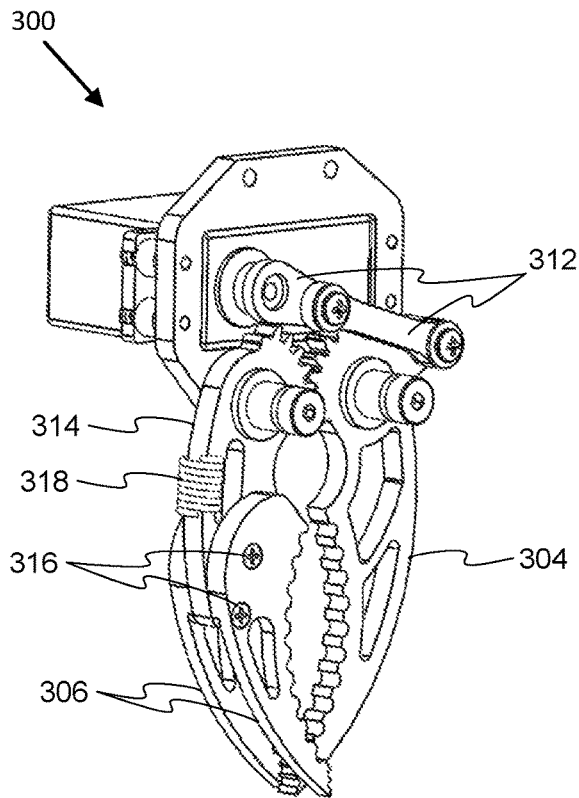
FIG. 3D is a perspective view illustrating another embodiment of the gripper of FIG. 3A with a compliance spring and a locking linkage in a fully closed position.

FIG. 3D is a perspective view illustrating another embodiment of the gripper 300 of FIG. 3A with a compliance element 318 and a locking linkage 312 in a fully closed position. In the illustrated embodiment, the locking linkage 312 reaches a fully extended position which corresponds with a fully closed position of the gripper 300. While the thumb 304 and fingers 306 of the gripper 300 are shown as fully closed with a relatively small amount of space separating the thumb 304 and fingers 306, in other embodiments, the fully closed position may include having the thumb 304 and fingers 306 separated by less space or more space. In some embodiments, the relative position of the thumb 304 and fingers 306 with the linkage 312 in the locked position is adjustable.

In the fully extended position, the linkage 312 uses relatively little energy to maintain the thumb 304 and fingers 306 in the closed position. In some embodiments, this may be referred to as a low-energy position. A low energy position may be achieved at least one of a fully closed position, a fully open position, and an intermediate position. This reduces strain on the gripper 300 and energy demand.

The compliance element 318 is disposed on a base component 314 of the fingers 306. The compliance element 318 is configured to deflect or experience a change in geometry which allows for more reliable gripping of a rigid object. Additionally, the compliance element 318 may provide a broader range of positions of the gripper 300 which will yield sufficient grip for a given object.

In some embodiments, the compliance element 318 provides the ability of the user to vary a gripping force from a light force to a heavy force proportional to a position input for the gripper 300. This may serve to prevent damage to the gripper 300 at the thumb 304 and finger 306, provide a more reliable grip, and reduce strain and energy variables for the servo motor or other drive system of the gripper 300.

In the illustrated embodiment, the compliance element 318 comprises a coil spring. In some embodiments, the compliance element may comprise a piston, a bar spring, a gel element, or the like. In the illustrated embodiment, the compliance element 318 is positioned on a base component 314 of the fingers 306 with the fingers 306 coupled to the base element 306 via attachment features 316 such as screws or other hardware or structures. In some embodiments, the thumb 304 may include a compliance element 318. In other embodiments, a compliance element is disposed on at least one of the thumb 304 and fingers 306 separately and/or individually.

Figure 3E:
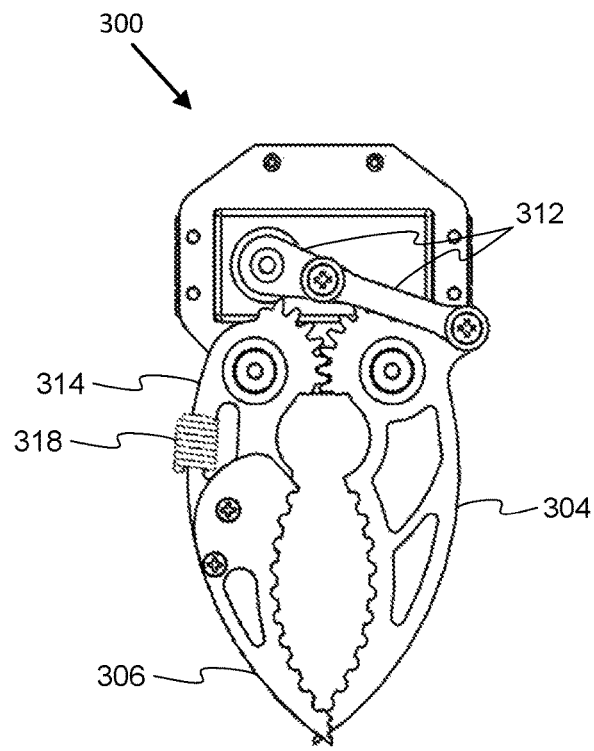
FIG. 3E is a side view illustrating one embodiment of the gripper of FIG. 3D in the fully closed position.

FIG. 3E is a side view illustrating one embodiment of the gripper of FIG. 3D in the fully closed position.

Figure 3F:
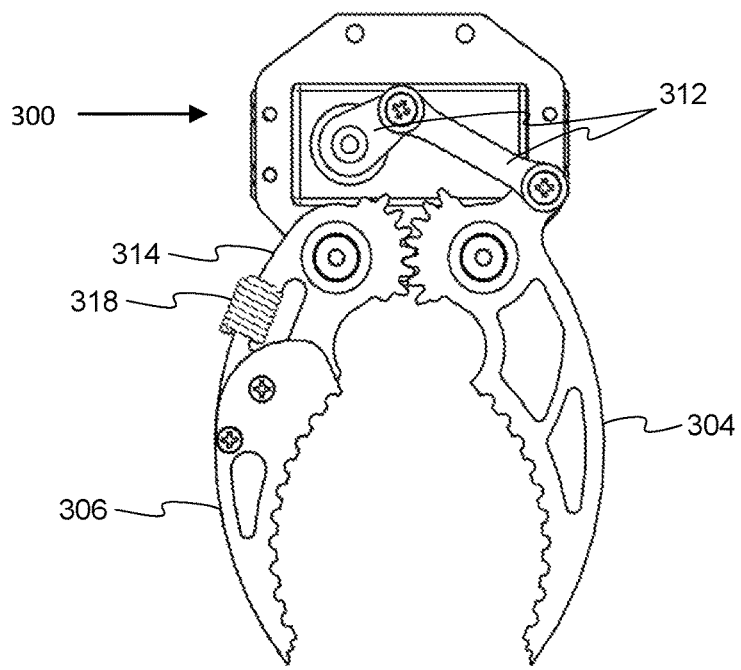
FIG. 3F is a side view illustrating one embodiment of the gripper of FIG. 3D in a partially open position.

FIG. 3F is a side view illustrating one embodiment of the gripper of FIG. 3D in a partially open position. In this embodiment, the locking linkage 312 has moved from the low-energy position and has begun to open the thumb 304 and finger 306 relative to one another. As described above, the gripper 300 may be configured to reach a second low-energy position as the gripper 300 reaches a fully-open position.

Figure 4A:
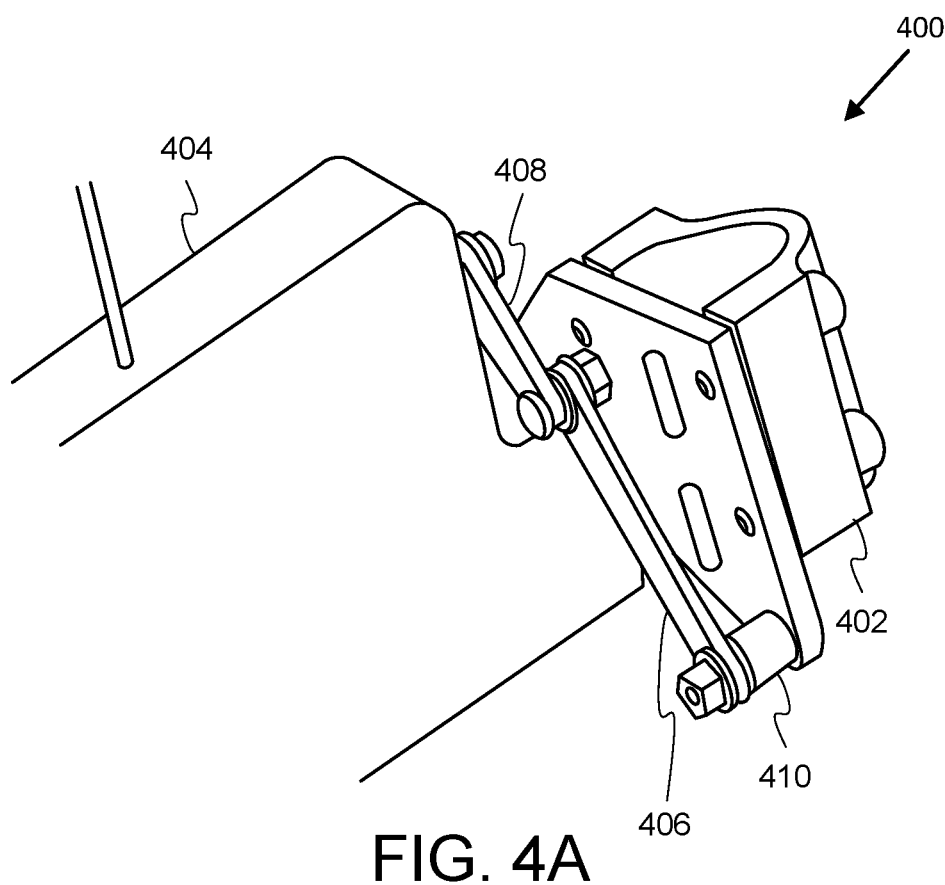
FIG. 4A is a perspective view illustrating one embodiment of a linkage assembly of a remote drone arm in a deployed position.

FIG. 4A is a perspective view illustrating one embodiment of a linkage assembly 400 of a remote drone arm in a deployed position. In the illustrated embodiment, the linkage assembly 400 includes mounting hardware 402 coupled to a base 404 of a remote drone arm. In the illustrated embodiment, the mounting hardware 402 facilitates connection to a location of a drone. For example, the mounting hardware 402 may clamp to a landing gear or other structure of a drone. In some embodiments, the mounting hardware 402 remains fixed relative to the drone while the base 404 moves relative to the drone. In some embodiments, the mounting hardware 402 is a fixed or removable connection. In some embodiments, the mounting hardware 402 is a quick coupling.

In some embodiments, the base 404 is similar to base 204 described above with reference to FIG. 2A. Other embodiments may include variations of the base 204 described above. In the illustrated embodiment, the linkage assembly 400 also includes a mount link 406 and a base link 408. In some embodiments, the mount link 406 and the base link 408 are mechanical linkages. In some embodiment, the mount link 406 and the base link 408 are elongated rigid structures that are rotatably coupled at one or both ends. In some embodiments, at least one of the mount link 406 and the base link 408 receives a force input to drive one or both of the mount link 406 and the base link 408.

In some embodiments, the base 404 includes a drive system (not shown) to apply a force to the base link 408 to rotate or otherwise move the base link 408 relative to the base 404. In some embodiments, the base link 408 is rotatably coupled to the mount link 406 and applies a force to the mount link 406 in response to movement of the base link 408. In response to the force received at the mount link 406, the mount link 406 applies a force to the mounting hardware 402. In some embodiments, the force applied to the mounting hardware 402 moves the base 404 relative to the mounting hardware 402.

In another embodiment, the mounting hardware 402 includes a drive system to apply force to the mount link 406 to move the base 404 relative to the mounting hardware 402. In some embodiments, the drive system is coupled to the base 404. In other embodiments, the drive system is coupled to the mounting hardware 402. Other embodiments include other driving system arrangements.

In the illustrated embodiment, the mount link 406 is rotatably coupled to the mounting hardware 402 and the base link 408. In some embodiments, the mount link 406 slides relative to the at least one of the mounting hardware 402 and the base link 408. In some embodiments, the base link 408 slides relative to at least one of the mount link 406 and the base 404.

In some embodiments, the mount link 406 is rotatably coupled to the mounting hardware 402 via a link coupler 410. In some embodiments, the link coupler 410 includes a spacer to separate the mounting hardware 402 from the base 404 to provide sufficient space for installation and operation of the mount link 406 and the base link 408.

In the illustrated embodiment, the linkage assembly 400 is oriented with the base link 408 and the mount link 406 fully extended to tilt the base 404 relative to the mounting hardware 402. In some embodiments, with the base 404 tilted with respect to the mounting hardware 402, the linkage assembly is deployed to extend an arm attached to the base 404 for manipulating an object.

In some embodiments, in the deployed arrangement, the linkage assembly 400 includes the base link 408 and the mount link 406 in an aligned position. In some embodiments, the aligned position of the base link 408 relative to the mount link 406 provides a mechanical advantage in the linkage assembly 400. In some embodiments, the mechanical advantage provides an improvement in stability of the linkage assembly 400. In other embodiments, the mechanical advantage provides a reduction in power required to maintain the deployed position of the linkage assembly 400. For example, in the deployed position, the linkage assembly 400 may apply relatively little to no torque on the associated drive system. In some embodiments, the mechanical advantage reduces battery and/or component wear and improves lifespan of the battery and/or component.

In the illustrated embodiment, the mounting hardware 402 is held relatively close to a corresponding end of the base 404. In other embodiments, the linkage assembly 400 moves the base 404 further from the mounting hardware 402. In some embodiments, the linkage assembly positions the base 404 to prevent or reduce blocking of one or more sensors or movement of a component of a drone platform as described in further detail below with respect to FIG. 6.

Figure 4B:
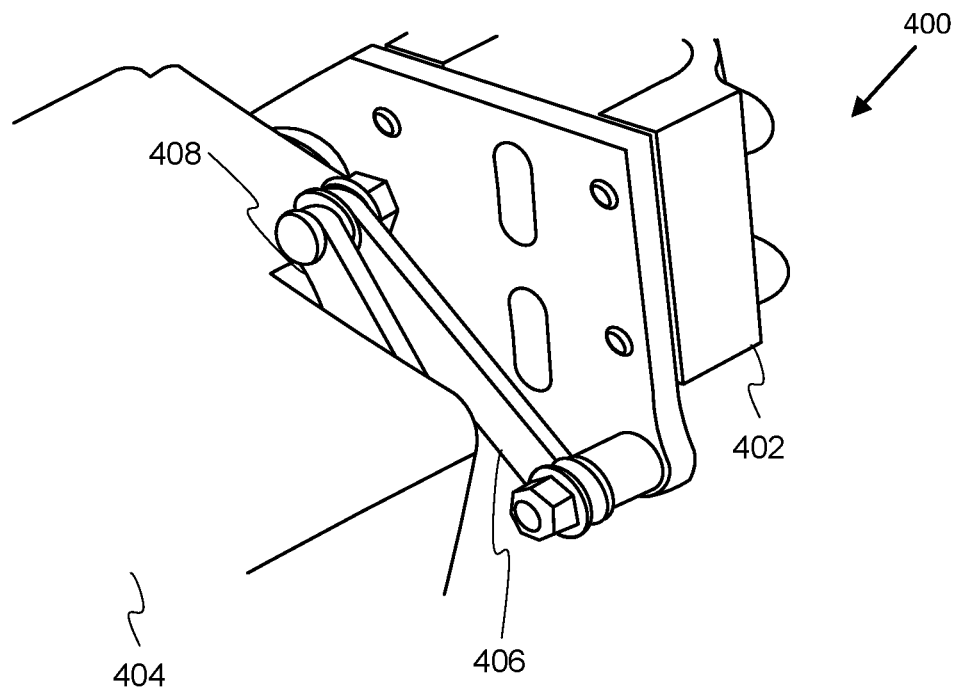
FIG. 4B is a perspective view illustrating one embodiment of the linkage assembly of FIG. 4A in a stowed position.

FIG. 4B is a perspective view illustrating one embodiment of the linkage assembly 400 of FIG. 4B in a stowed position. In the illustrated embodiment, the linkage 400 is in a stowed position with the base link 408 substantially parallel to the mount link 406.

Similar to the deployed position described above with relation to FIG. 4A, the stowed position illustrated in FIG. 4B approximately aligns the mount link 406 and the base link 408. In some embodiments, the stowed position of the linkage assembly 400 provides a mechanical advantage. In some embodiments, mechanical advantage of the stowed position of the linkage assembly 400 provides the same or similar benefits to those described above with relation to FIG. 4A. For example, in the stowed position, the linkage assembly 400 may apply relatively little to no torque on an associated drive system. Other advantages are also realized.

FIG. 5A is a perspective view illustrating one embodiment of a mounting structure 500 of a remote drone arm. In the illustrated embodiment, the mounting structure 500 is a structure coupled to a mounting hardware 502. In some embodiments, the mounting structure 500 provides additional interface to secure the mounting hardware 502 to a portion of a drone.

In the illustrated embodiment, the mounting structure 500 has a wedge-like geometry to interface with an interior structure of a landing strut of a drone. For example, the mounting structure 500 may match up with a ribbed portion within the structure of the landing strut of the drone.

In other embodiments, the mounting structure 500 has a non-wedge. For example, the mounting structure 500 may be rounded or planar, have square or non-square edges, and/or be rigid, semi-rigid, or flexible. In some embodiments, the mounting structure 500 includes a texture, grip material, or other structure or feature to provide increased stability and precise orientation of the mounting hardware 502 during operation of a remote drone arm.

FIG. 5B1 is a perspective view illustrating one embodiment of a quick coupling mounting hardware 502 of a remote drone arm in an open position. In the illustrated embodiment, the mounting hardware 502 includes a quick coupling 504. In the illustrated embodiment, the quick coupling 504 is shown in the open position. In some embodiments, the quick coupling 504 includes a hinge 506. In some embodiments, the hinge 506 allows the quick coupling 504 to open into the illustrated position.

The illustrated embodiment also includes an attachment structure 508. In the illustrated embodiment, the attachment structure 508 is a thumbs screw. In other embodiments, the attachment structure 508 includes one of a thumbscrew, a snap, a latch, a clip, a friction lock, a clasp, or other retaining structures.

FIG. 5B2 is a perspective view illustrating one embodiment of a quick coupling mounting hardware 502 of a remote drone arm in a closed position. In the illustrated embodiment, the mounting hardware 502 includes the quick coupling 504 in the closed position. In some embodiments, the quick coupling 504 is in the closed position when the attachment structure 508 is engaged with the mounting hardware 502 to secure the quick coupling 504.

In some embodiments, the quick coupling 508 includes a mounting structure such as the mounting structure 500 shown in FIG. 5A. In some embodiments, the quick coupling 508 is custom fit to a particular geometry corresponding to a particular drone or drone model. In other embodiments, the quick coupling 508 is compatible with a plurality of drones and/or drone models. In some embodiments, the quick coupling 508 is swappable relative to the mounting hardware 502 to facilitate attachment of a compatible quick connect 504.

Figure 6:
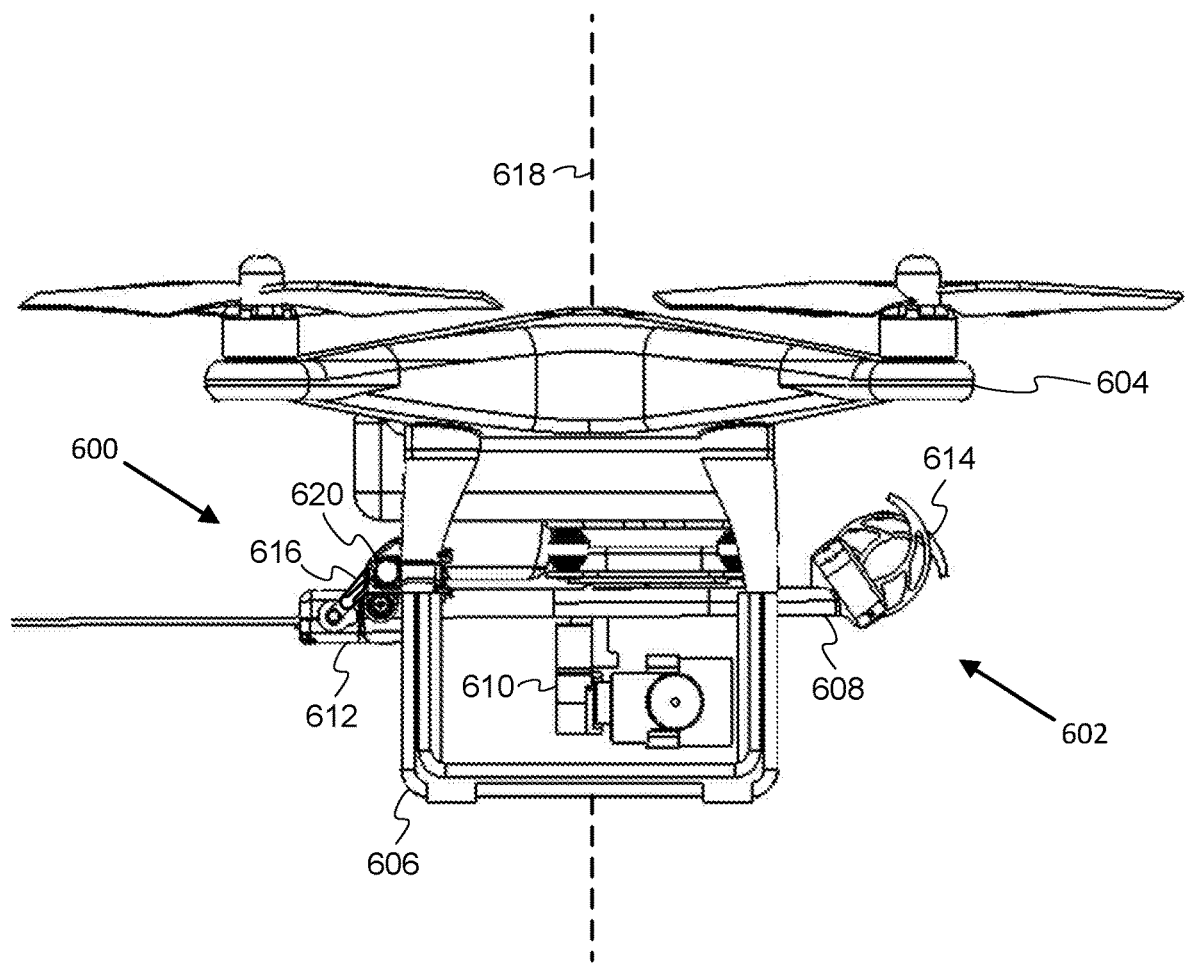
FIG. 6 is a side view illustrating one embodiment of an offset mounting arrangement for a remote drone arm.

FIG. 6 is a side view illustrating one embodiment of an offset mounting arrangement 600 for a remote drone arm 602. In the illustrated embodiment, the remote drone arm 602 is mounted on a drone platform 604. In some embodiments, the remote drone arm 602 is capable of mounting to a landing strut 606 of the drone platform 604. In other embodiments, the remote drone arm 602 mounts to another structure or surface of the drone platform 604.

In the illustrated embodiment, the remote drone arm 602 is mounted in an offset mounting arrangement 600 moving a base 612 of the remote drone arm 602 away from a centerline of the drone platform 604 to reduce or avoid conflict between the remote drone arm 602 and one or more components or features of the drone platform 604.

In some embodiments, the offset mounting arrangement 600 of the remote drone arm 602 avoids conflict between the arm 608 of the remote drone arm 602 and a sensor package 610 of the drone platform 604. In other embodiments, the offset mounting arrangement 600 avoids conflict between a base 612 of the remote drone arm 602 and the drone platform 604. In some embodiments, the offset mounting arrangement 600 of the remote drone arm 602 reduces or prevents detrimental incursion of the remote drone arm 602 into a sensor or camera field of view. In other embodiments, the offset mounting arrangement 600 of the remote drone arm 602 reduces or prevents signal interference between the remote drone arm 602 and the drone platform 604.

In some embodiments, the offset mounting arrangement 600 avoids conflict between a gripper 614 of the remote drone arm 602 and the drone platform 604. In some embodiments, the offset mounting arrangement 600 is achieved by a geometry of a linkage assembly 616. In other embodiments, the offset mounting arrangement 600 is achieved by a geometry of a mounting hardware 620. In some embodiments, other structures of the remote drone arm 602 move the base 612 out away from the centerline of the drone platform 604.

Figure 7:
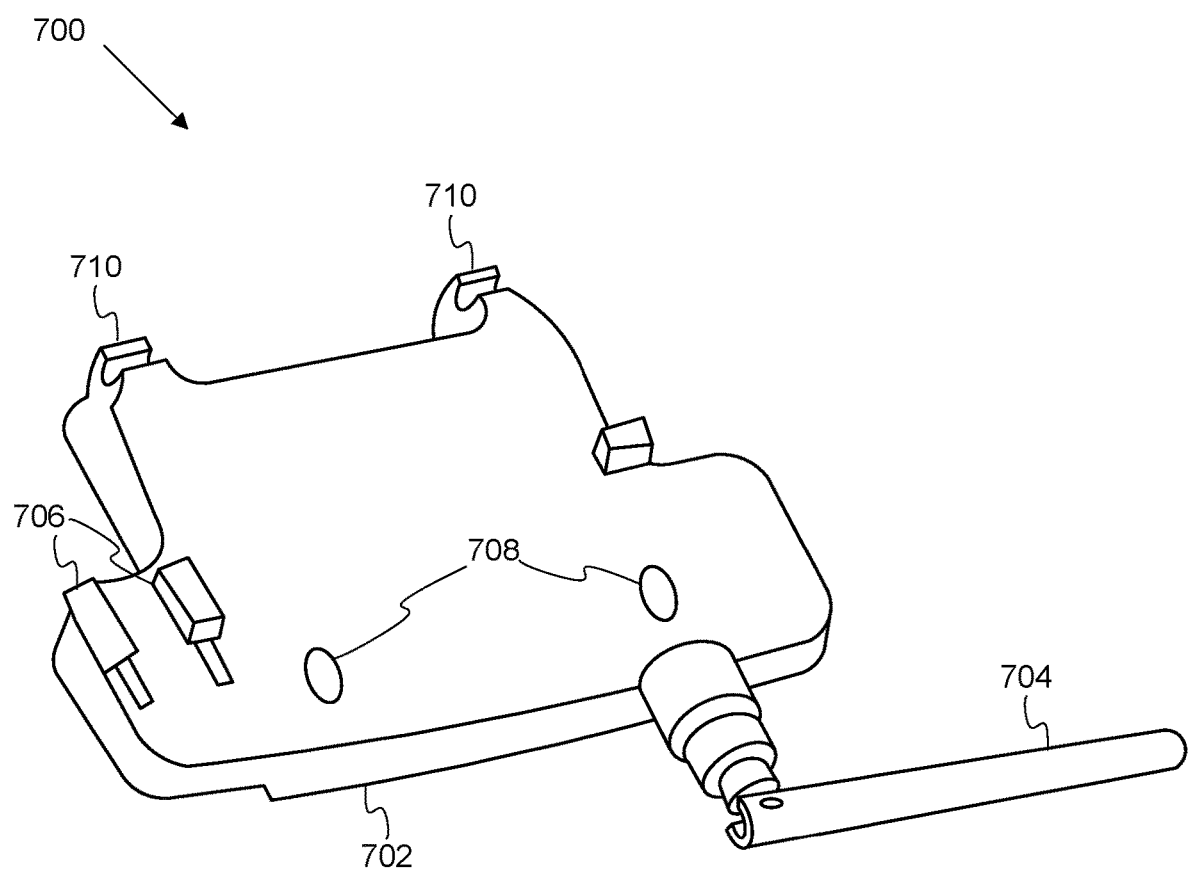
FIG. 7 is a perspective view illustrating one embodiment of a control module of a remote drone arm system.

FIG. 7 is a perspective view illustrating one embodiment of a control module 700 of a remote drone arm system. In the illustrated embodiment, the control module 700 includes a housing 702. In some embodiments, the housing 702 forms an outer protective enclosure for internal components of the control module 700. In some embodiments, the housing 702 includes one or more materials. In some embodiments, the housing 702 is at least partially made of plastic, metal, composite, or other materials. In some embodiments, the geometry of the housing 702 corresponds with a geometry of a drone platform. For example, the geometry of the housing 702 may correspond to a drone platform from DJI™.

In the illustrated embodiment, the control module 700 includes an antenna 704. In the illustrated embodiment, the antenna 704 is hingedly coupled to the housing 702. In some embodiments, the antenna 704 is fixed at some angle relative to the housing 702. In some embodiments, the antenna 704 is removeable from the housing 702. In other embodiments, the antenna 704 is permanently attached to the housing 702.

In some embodiments, the antenna 704 is integrated along an interior of the housing 702. For example, the antenna 704 may be positioned within the housing 702. For example, the antenna 704 may run along at least a portion of the interior of the housing 702 on an edge of the housing 702 so as not to protrude from the housing 702. In some embodiments, the antenna 704 is arranged to lay on a surface of the housing 702. In some embodiments, the antenna 704 is incorporated with another portion of the control module 700.

In the illustrated embodiment, the control module 700 includes one or more control interfaces 706. In the illustrated embodiment, the control interfaces 706 are sliders. In some embodiments, the control interfaces 706 include one or more of a joystick, a button, a touch interface, a switch, a wheel, a directional pad, a rocker, or a key. Other interface devices may also be included.

In some embodiments, the control interfaces 706 are activated in response to a power on input. In other embodiments, the control interfaces 706 are activated in response to detection that the control module 702 is coupled to a drone controller. In some embodiments, the control interfaces are activated in response to a determination that the drone controller is active. Other activation triggers are also contemplated.

In the illustrated embodiment, two control interfaces 706 are shown. In other embodiments, one or more than two control interfaces 706 are included. In the illustrated embodiment, the control interfaces 706 are shown on the same surface and general area as one another. In some embodiments, the control interfaces 706 are located on different parts of the housing 702.

In some embodiments, the control interfaces 706 are together. In other embodiments, the control interfaces 706 are separated to opposite sides of the housing 702 to correspond to holding locations for the drone controller 802. In the illustrated embodiment, the orientation or action of the control interfaces 706 is substantially similar. In some embodiments, the orientation of one of the control interfaces 706 is different from the orientation of the other.

In some embodiments, the control interfaces 706 are located on the control module 700 at locations which correspond to a hand position of a drone controller of a drone. For example, the control interfaces 706 may be located on the control module 700 to be at or near the position of a user's fingers while they are holding the drone controller. In one example, a user may use their thumbs to control the flight of a drone while they use their forefingers to operate the control interfaces 706 to move a remote drone arm.

The illustrated embodiment of the control module 700 also includes support structures 708. In the illustrated embodiment, the support structures 708 protrude from the housing 702 of the control module 700. In some embodiments, the support structures 708 provide physical support to the control module 700 when the control module 700 is set down on a resting surface such as the ground, a table, a floor, etc.

In some embodiments, the support structures 708 have sufficient geometry to provide enough clearance for the control interfaces 706 to avoid contact with the resting surface. In some embodiments, the support structures 708 provide a location on the housing 702 to receive wear and impact during use. In some embodiments, the support structures 708 include a material which is resistant to wear and breakage. In some embodiments, the support structure 708 include a replaceable component that absorbs impact and wear. While the illustrated embodiment depicts two support structures 708, other embodiments include one or more than two support structures 708.

The illustrated embodiment of the control module 700 includes retaining structures 710. In some embodiments, the retaining structures 710 form locations in the housing 702 at which a drone controller is secured. In some embodiments, the retaining structures 710 have a hook-like geometry to snap onto a bar or similar structure of a drone controller. In other embodiments, the retaining structures 710 include a snap, post, magnet, buckle, clip, claw, friction lock, screw, tab, groove, raised portion, or other structure to interface with and at least partially secure the control module to a drone controller.

In some embodiments, the control module 700 includes internal components. In some embodiments, the internal components include a power source. For example, the power source may include a battery, an electrical connector, or other system to supply power to the control module 700. In some embodiments, the control module 700 includes a connector to facilitate charging or exchanging of data.

In some embodiments, the internal components include a communication system coupled to the antenna 704. In some embodiments, the communication system communicates, via the antenna 704, with the remote drone arm such as that described above with reference to FIG. 2. In some embodiments, the communication system communicates separately from a communication system of a drone controller to communicate with the drone platform. In other embodiments, the communication of the control module 700 interacts with the drone controller to communicate with the remote drone arm.

In some embodiments, the control module 700 includes a display. In some embodiments, the display indicates a state of the control module 700 or an associated remote drone arm. For example, the display may indicate a charge state of at least one of the control module 700 and the remote drone arm. In another example, the display may indicate communication strength relating to the communication link between the control module 700 and the remote drone arm. In a further example, the display may indicate a position or state of the remote drone arm such as stowed, deployed, degree of deployment, gripper opened, gripper closed, gripper degree of close, object secured in gripper, or other statuses or states relating to the control module, remote drone arm, drone controller, or drone platform.

Figure 8:
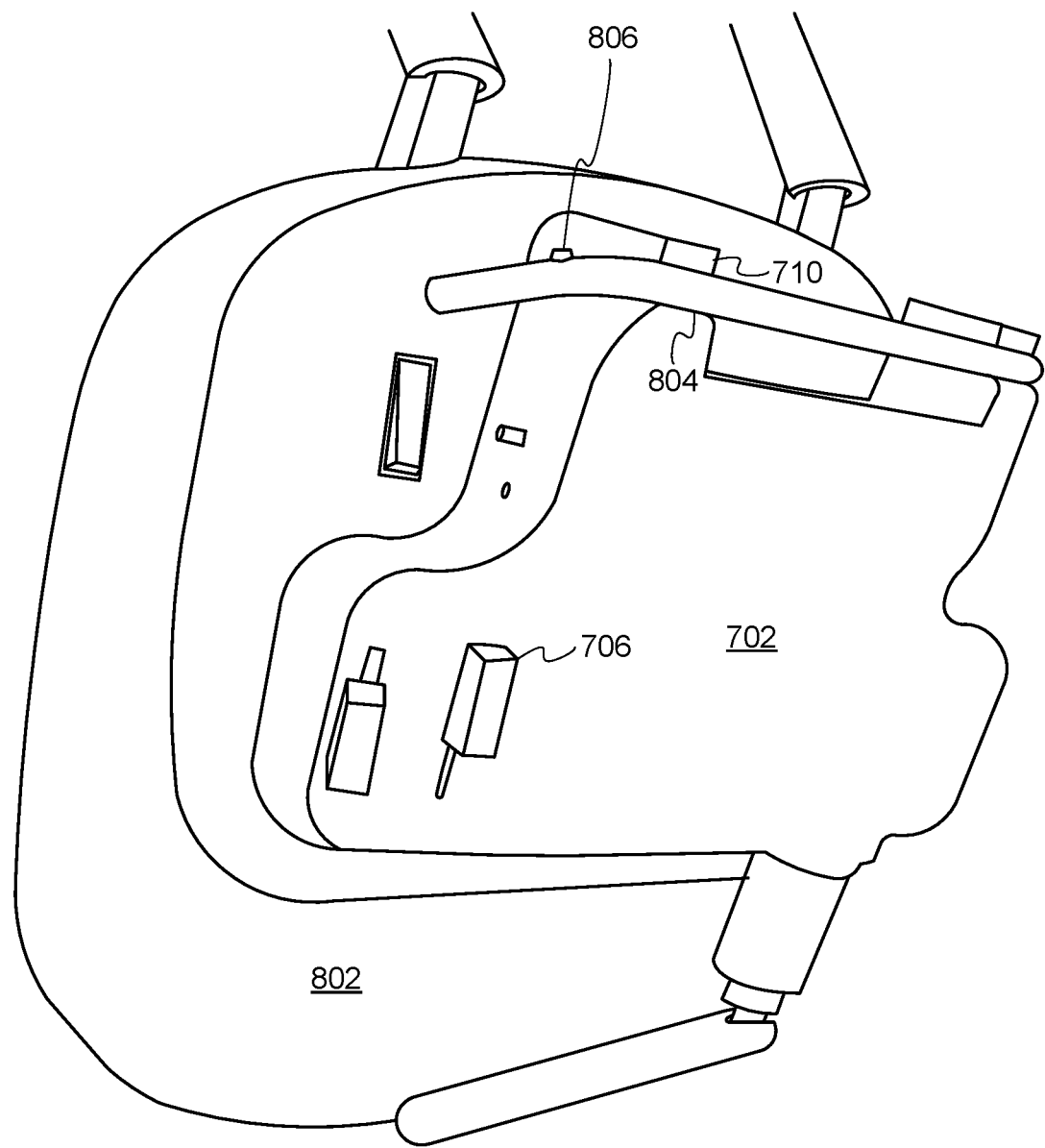
FIG. 8 is a perspective view illustrating one embodiment of the control module of FIG. 7 coupled to a drone controller.

FIG. 8 is a perspective view illustrating one embodiment of the control module 702 of FIG. 7 coupled to a drone controller 802. In the illustrated embodiment, the control module 702 is coupled to the drone controller 802 by securing the retaining structures 710 to a structure of the drone controller 802. In the illustrated embodiment, the retaining structures 710 interface with a bar 804 of the drone controller 802.

In some embodiments, the retaining structures 710 apply a retaining force to the bar 804 to secure the control module 702 relative to the drone controller 802. In some embodiments, the retaining structures 710 clamp onto the bar 804 but allow the control module 702 to hinge about the bar 804. In some embodiments, the control module 702 further includes locking structures 806.

In some embodiments, the locking structures 806 secure the control module 702 in a fixed position relative to the drone controller 802. In some embodiments, the locking structures 806 include a raised portion on the control module 702 near the retaining structures 710 which engage the bar 804 when the control module 702 is rotated to a locking position. In some embodiments, the locking structures 806 apply a retaining force to the bar 804 to resist movement of the control module out of the locking position.

In some embodiments, the locking position is a position of the control module 702 relative to the drone controller 802 which places the control interface 706 within reach of a user while operating the drone controller 802. In some embodiments, the locking position facilitates communication of at least one of data and power between the drone controller 802 and the control module 702.

In some embodiments, the locking structure 806 includes a raised structure on the surface of the control module 702. In other embodiments, the locking structure 806 includes a strap, clip, clamp, pin, hook, catch, post, toggle, or other mechanism or structure.

In some embodiments, the locking structure 806 automatically engages with the bar 804 or other structure of the drone controller 802 in response to positioning of the control module 702 in the locking position relative to the drone controller 802. In other embodiments, the locking structure 806 in manually manipulated to secure the control module 702 relative to the drone controller 802.

Figure 9:
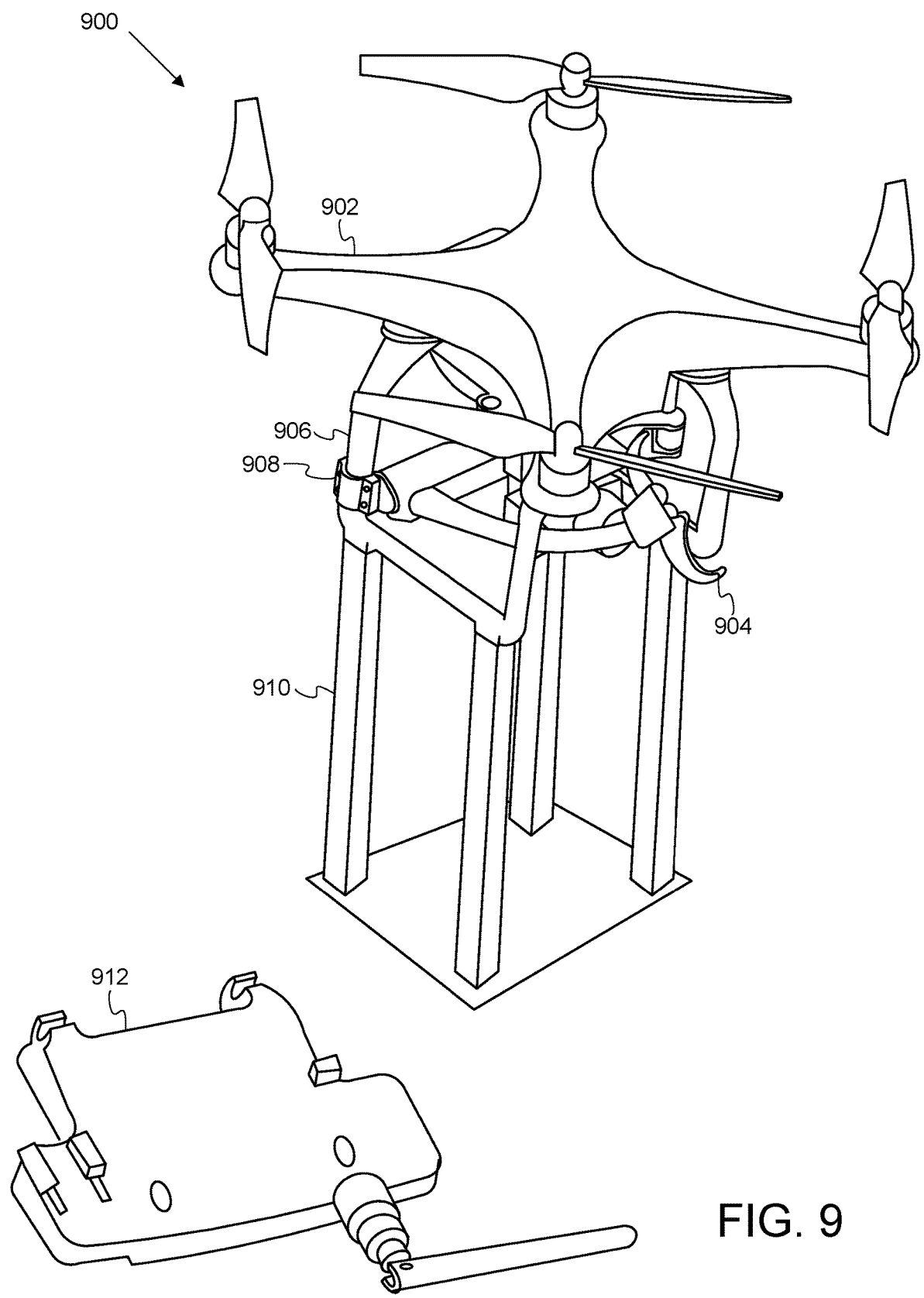
FIG. 9 is a schematic view illustrating one embodiment of a drone cargo system.

FIG. 9 is a schematic view illustrating one embodiment of a drone cargo system 900. In the illustrated embodiment, a drone 902 is outfitted with a remote drone arm 904. In some embodiments, the remote drone arm 904 is similar to the remote drone arm 200 described above with reference to FIG. 2. In the illustrated embodiment, the remote drone arm 904 is coupled to a landing strut 906 of the drone 902 by a mounting hardware 908. In some embodiments, the mounting hardware 908 is similar to the mounting hardware 402 described above with respect to FIGS. 4A and 4B.

In the illustrated embodiment, the drone cargo system 900 includes a perch 910. In some embodiments, the perch 910 provides a structure to support the drone 902 during a loading or unloading stage of a cargo transport. In the illustrated embodiment, the perch 910 interfaces with one or more landing struts 906 of the drone 902. In some embodiments, the perch 910 allows the remote drone arm 904 to be extended to receive or release an object. In some embodiments, the perch 910 provides sufficient clearance for the remote drone arm 904 to be extended and manipulate an object. In other embodiments, the structure of the perch 910 provides sufficient clearance for the drone to land 902 and/or take off with an object secured in the remote drone arm 904. In some embodiments, the perch 910 includes a holding structure (not shown) to receive or present the object at the remote drone arm 904.

In some embodiments, the perch 910 includes one or more guidance assist components to allow the drone to execute a guided landing or take-off relative to the perch 910. In some embodiments, the sensor components include radio-frequency (RF) emitters/detectors. Other embodiments include other sensors, markings, or guidance assist. In some embodiments, the drone detects the one or more guidance assist components and performs an automatic maneuver relative to the perch 910. In other embodiments, the one or more guidance assist components provides a reference for a drone pilot to maneuver the drone relative to the perch 910. In some embodiments, the one or more guidance assist components are located in a leg and/or base of the perch 910

In the illustrated embodiment, the drone cargo system also includes a control module 912. In some embodiments, the control module 912 generates and sends outgoing control signals to the remote drone arm 904 to control movement of the remote drone arm 904. In some embodiments, the control module 912 receives incoming control signals from the remote drone arm 904 related to position, movement, sensor data, or other aspects of the remote drone arm 904. In some embodiments, the control module 912 is capable of communicating with the drone 902. In other embodiments, the control module 912 communicates with the remote drone arm 904 exclusive of the drone 902.

While the illustrated embodiment of the drone cargo system 900 is shown with the above described components, other embodiments include fewer or more components with corresponding function and capability.

Figure 10:
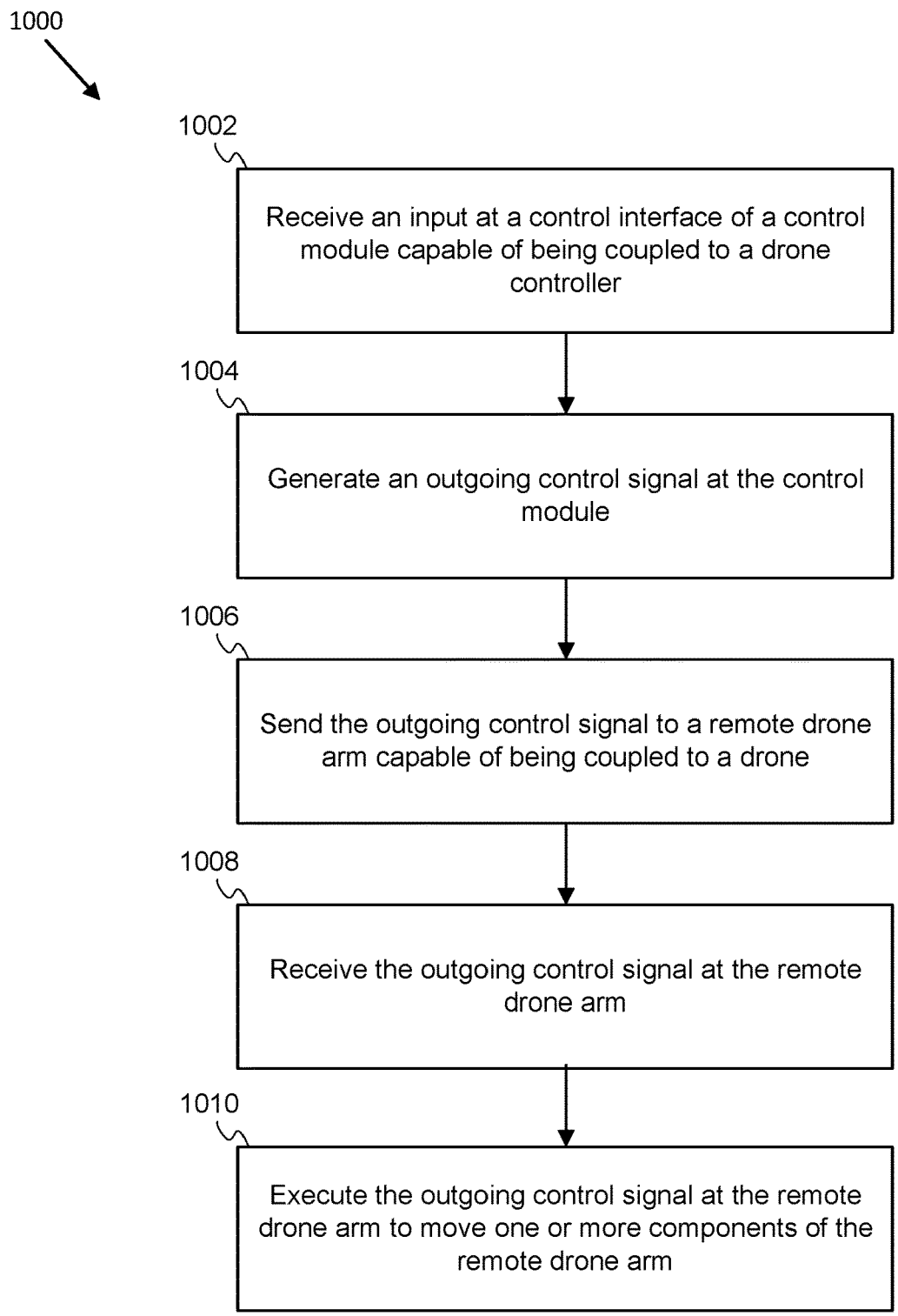
FIG. 10 is a flowchart illustrating one embodiment of a method of using a remote drone arm.

FIG. 10 is a flowchart illustrating one embodiment of a method 1000 of using a remote drone arm. In the illustrated embodiment, the method 1000 includes, at block 1002, receiving an input at a control interface of a control module capable of being coupled to a drone controller. In some embodiments, the control interface receives the input directly from a user. In some embodiments, the control interface receives the input in the form of a signal from another device such as the drone controller.

In some embodiments, the control module is capable of being physically coupled to an underside of the drone controller. In other embodiments, the control module is capable of being physically coupled to another side, surface, or structure of the drone controller. In some embodiments, the control interface of the control module provides an interface to receive the input through mechanical manipulation, electronic detection, digital communication, or other detection systems.

In some embodiments, the control module is capable of being coupled to the drone controller by attaching to a structure of the drone controller. In some embodiments, the coupling of the control module to the drone controller is non-intrusive. In some embodiments, the control module is permanently or semi-permanently installed onto the control module. In other embodiments, the control module is an integrated component of the drone controller.

At block 1004, the method 1000 includes generating an outgoing control signal and the control module. In some embodiments, the outgoing control signal includes one or more movement components. For example, the outgoing control signal may specify one or more of a deployment, stowage, pitch, yaw, roll, extension, grip, or bend of a linkage, arm, gripper, or other component of the remote drone arm. Other embodiments include commands or data specifying or controlling fewer or more aspects or movement of the remote drone arm.

At block 1006, the method 1000 includes sending the outgoing control signal to a remote drone arm capable of being coupled to a drone. In some embodiments, the outgoing control signal is sent via a wired or wireless communication system or protocol. In some embodiments, the wireless communication protocol includes one of a near-field, Fresnel, far-field using radio, micro, infrared, light, ultraviolet, x-ray, gamma or other electromagnetic or non-electromagnetic communication signals.

In some embodiments, the outgoing signal is sent on a frequency or transmitted to avoid interference with a signal from the drone controller. In other embodiments, the outgoing signal piggybacks or is transmitted with a signal from the drone controller. In some embodiments, the outgoing signal is sent via an external antenna. In other embodiments, the outgoing signal is sent via an internal antenna or an integrated antenna.

In some embodiments, the remote drone arm is capable of being coupled to the drone in a non-intrusive manner. In some embodiments, the remote drone arm couples to the drone at a physical structure of the drone. In other embodiments, the remote drone arm couples to the drone via a magnetic, mechanical, or other connection. In some embodiments, the remote drone arm is an incorporated portion of the drone that is built into the drone during assembly of the drone or after the drone is assembled.

At block 1008, the method 1000 also includes receiving the outgoing control signal at the remote drone arm. In some embodiments, the outgoing control signal is received at the remote drone arm via an external antenna of the remote drone arm. In other embodiments, the outgoing control signal is received at the remote drone arm via an internal antenna such as an antenna incorporated into an arm portion of the remote drone arm. In some embodiments, the outgoing control signal is received at the remote drone arm via an integrated antenna. Other embodiments include other antenna arrangements.

At block 1010, the method 1000 includes executing the outgoing control signal at the remote drone arm to move one or more components of the remote drone arm. In some embodiments, executing the outgoing control signal at the remote drone arm includes moving the gripper, moving a linkage, moving a base of the remote drone arm, moving an arm of the remote drone arm, or moving another component of the remote drone arm.

In some embodiments, movement of the one or more components of the remote drone am is monitored by a sensor. For example, the movement of the one or more components of the remote drone may be measured by a position sensor or a camera. Other manners of monitoring movement of the remote drone arm are contemplated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A drone payload device comprising:
   a remote drone arm coupleable to a drone, the remote drone arm comprising:
      a base comprising mounting hardware to couple to the drone;
      an arm extending from the base; and
      a gripper coupled to the arm at an end of the arm distal from the base; and
   a control module coupleable to a drone controller, the control module to provide a control signal to the remote drone arm to control a movement of at least one of the arm and the gripper wherein both the remote drone arm and the control module are operable separate from the drone and the drone controller.

2. The drone payload device of claim 1, wherein the control module is coupleable to the drone controller via a retaining structure.

3. The drone payload device of claim 2, wherein the retaining structure comprises a hook-like structure configured to clip onto a component of the drone controller.

4. The drone payload device of claim 1, wherein the comprising at least one control interface to configure the control signal from the control module.

5. The drone payload device of claim 4, wherein the at least one control interface comprises a slider.

6. The drone payload device of claim 1, wherein the mounting hardware is configured to position the remote drone arm to avoid interference with a system of the drone.

7. The drone payload device of claim 1, wherein the gripper comprises at least one finger and at least one thumb to grip a payload.

8. The drone payload device of claim 7, wherein the gripper comprises two fingers with the fingers positioned next to and spaced apart from one another sufficient to allow the thumb to pass between the two fingers in a scissor-like motion.

9. The drone payload device of claim 7, further comprising a synchronization interface to synchronize movement of the at least one finger with the at least one thumb.

10. The drone payload device of claim 7, wherein the gripper further comprises a compliance element disposed in at least one of the at least two fingers, the compliance spring configured to deflect in response to force applied at a corresponding at least one of the at least two fingers.

11. The drone payload device of claim 1, further comprising an antenna to facilitate wireless communication between at least two of the remote drone arm, the control module, the drone controller, and the drone.

12. The drone payload device of claim 11, wherein the antenna is an internal antenna.

13. The drone payload device of claim 12, wherein the antenna is an internal antenna disposed in the arm of the remote drone arm.

14. The drone payload device of claim 1, wherein the mounting hardware comprises a quick coupling to facilitate rapid coupling and uncoupling of the remote drone arm relative to the drone.

15. The drone payload device of claim 1, further comprising a stiffener element disposed in the arm.

16. A drone cargo system comprising:
a drone;
a remote drone arm coupleable to a drone to be beneath the drone and operationally separate from the drone, the remote drone arm comprising:
 a base comprising mounting hardware to couple to the drone;
 an arm extending from the base; and
 a gripper coupled to the arm at an end of the arm distal from the base; and
a control module coupleable to a drone controller and operationally separate from the drone controller, the control module to provide a control signal to the remote drone arm to control a movement of at least one of the arm and the gripper.

17. The drone cargo system of claim 16, further comprising a perch configured to support the drone while landed in loading or unloading stage.

18. The drone cargo system of claim 16, wherein the gripper comprises three fingers with two of the fingers positioned next to and spaced apart from one another sufficient to allow the other finger to pass between the two fingers in a scissor-like motion, the motion of the fingers controlled by at least one linkage.

19. The drone cargo system of claim 18, wherein the at least one linkage comprises a plurality of linkages which reach a low-energy position at at least one of the fully open and fully closed positions.

20. A method of operating a remote drone arm, the method comprising:
receiving an input at a control interface of a control module operationally independent from a drone controller and capable of being coupled to the drone controller;
generating an outgoing control signal at the control module;
sending the outgoing control signal to the remote drone arm operationally independent from a drone and capable of being coupled to the drone;
receiving the outgoing control signal at the remote drone arm; and
executing the outgoing control signal at the remote drone arm to move one or more components of the remote drone arm.

* * * * *